(12) United States Patent
Chung et al.

(10) Patent No.: US 11,733,850 B2
(45) Date of Patent: Aug. 22, 2023

(54) SLIDE GRID SNAPPING AND COMMENT ANYWHERE FOR PRESENTATION SLIDES IN A CLOUD COLLABORATION PLATFORM

(71) Applicant: salesforce.com, inc., San Francisco, CA (US)

(72) Inventors: Andy Chung, Berkeley, CA (US); Aaron Boodman, San Francisco, CA (US); Joshua Li, San Francisco, CA (US); Erik Arvidsson, San Francisco, CA (US); Kevin Gibbs, San Francisco, CA (US); Diana Berlin, San Francisco, CA (US)

(73) Assignee: Salesforce, Inc., San Francisco, CA (US)

(*) Notice: Subject to any disclaimer, the term of this patent is extended or adjusted under 35 U.S.C. 154(b) by 0 days.

(21) Appl. No.: 16/263,860

(22) Filed: Jan. 31, 2019

(65) Prior Publication Data

US 2020/0089397 A1 Mar. 19, 2020

Related U.S. Application Data

(60) Provisional application No. 62/735,731, filed on Sep. 24, 2018, provisional application No. 62/735,746, (Continued)

(51) Int. Cl.
*H04L 29/08* (2006.01)
*G06F 3/04847* (2022.01)
(Continued)

(52) U.S. Cl.
CPC ........ *G06F 3/04847* (2013.01); *B25J 9/1694* (2013.01); *B25J 13/08* (2013.01);
(Continued)

(58) Field of Classification Search
None
See application file for complete search history.

(56) References Cited

U.S. PATENT DOCUMENTS

| 11,074,219 B2* | 7/2021 | Yazganarikan | ....... G06F 16/176 |
| 2005/0068290 A1* | 3/2005 | Jaeger | ................. G06F 3/04845 |
| | | | 345/156 |

(Continued)

OTHER PUBLICATIONS

Laura Spencer, "How to Use Google Slides Presentation Collaboration Tools Online," Jan. 2, 2018, Envato Tuts+, retrieved from https://business.tutsplus.com/tutorials/google-slides-online-presentation-collaboration-tools-cms-30066. (Year: 2018).*

(Continued)

*Primary Examiner* — Dino Kujundzic
(74) *Attorney, Agent, or Firm* — Sterne, Kessler, Goldstein & Fox P.L.L.C.

(57) ABSTRACT

Disclosed herein are system, method, and computer program product embodiments for slide grid snapping for presentations slides in a cloud collaboration platform. An embodiment operates by displaying a slide made up of rows and columns of pixels, receiving inputs to select and move an object, interpreting the movement, based on proximity to particular rows and columns, places the object along the particular row and column of pixels, and rendering the resulting slide. By serializing and coordinating design actions using the slide grid, the ease of design and the efficiency of the user experience may be enhanced. The grid system further allows users to comment anywhere in the document, associating those comments with objects or layers, and adjusting or moving the comments in response to grid-based actions.

20 Claims, 13 Drawing Sheets

Related U.S. Application Data filed on Sep. 24, 2018, provisional application No. 62/733,075, filed on Sep. 18, 2018.

(51) Int. Cl.
| | |
|---|---|
| *G06F 3/0486* | (2013.01) |
| *H04L 65/401* | (2022.01) |
| *G06F 3/04883* | (2022.01) |
| *G06F 40/106* | (2020.01) |
| *G06F 16/2457* | (2019.01) |
| *G06F 16/176* | (2019.01) |
| *G06Q 10/101* | (2023.01) |
| *G06F 11/34* | (2006.01) |
| *B25J 9/16* | (2006.01) |
| *B25J 13/08* | (2006.01) |
| *G06N 3/008* | (2023.01) |
| *G10L 15/22* | (2006.01) |
| *H04L 67/50* | (2022.01) |
| *G06F 3/14* | (2006.01) |
| *G06F 40/169* | (2020.01) |

(52) U.S. Cl.
CPC ........ *G06F 3/0486* (2013.01); *G06F 3/04883* (2013.01); *G06F 11/34* (2013.01); *G06F 16/176* (2019.01); *G06F 16/24573* (2019.01); *G06F 40/106* (2020.01); *G06N 3/008* (2013.01); *G06Q 10/101* (2013.01); *G10L 15/22* (2013.01); *H04L 65/4015* (2013.01); *H04L 67/535* (2022.05); *G06F 3/1454* (2013.01); *G06F 40/169* (2020.01)

(56) References Cited

U.S. PATENT DOCUMENTS

| | | | | |
|---|---|---|---|---|
| 2008/0215964 | A1* | 9/2008 | Abrams | ........... G06F 40/10 715/246 |
| 2010/0020101 | A1* | 1/2010 | Schormann | ........... G06T 11/60 345/654 |
| 2011/0035692 | A1* | 2/2011 | Sandone | ........... G11B 27/034 715/769 |
| 2014/0096012 | A1* | 4/2014 | Grosz | ........... G06F 3/1205 715/733 |
| 2014/0281875 | A1* | 9/2014 | Branton | ........... G06F 40/169 715/230 |
| 2014/0306993 | A1* | 10/2014 | Poulos | ........... G06T 19/006 345/633 |
| 2017/0228359 | A1* | 8/2017 | Cuzzort | ........... G06F 3/1454 |
| 2019/0138589 | A1* | 5/2019 | Udell | ........... G06F 40/169 |
| 2019/0354247 | A1* | 11/2019 | Edmunds | ........... G06F 3/0482 |
| 2020/0326846 | A1* | 10/2020 | Leong | ........... G06F 3/04886 |

OTHER PUBLICATIONS

Geetesh Bajaj, "Snap to Grid Settings in PowerPoint 2013 for Windows," Apr. 17, 2013, Indezine, retrieved from https://www.indezine.com/products/powerpoint/learn/interface/snap-grid-settings-ppt2013.html. (Year: 2013).*

Tyler Osborne, "How to group and ungroup objects in Google Slides," Sep. 30, 2017, YouTube video, 2 minutes and 40 seconds, available at https://youtu.be/jCVSUfm9QLg (Year: 2017).*

Extended European Search Report issued in European Application No. EP19197677.8, dated Dec. 17, 2019 (10 pages).

Reach, Catherine Sanders, "Google Drive Collaboration: It's a Document Party!", Attorney at Work, Mar. 18, 2019, available at: http://www.attorneyatwork.com/google-drive-collaboration-document-party-multiple-editors/ (5 pages).

Keeler, Alice, "Direct Comment to Someone in Google Docs—Teacher Tech", Apr. 22, 2016, available at: https://alicekeeler.com/2014/09/10/direct-comment-to-someone-in-google-docs/ (5 pages).

"Make Google Slides presentations interactive Poll Everywhere", Nov. 5, 2016, available at: https://www.polleverywhere.com/app/google-slides (4 pages).

* cited by examiner

SLIDE GRID SNAPPING AND COMMENT ANYWHERE FOR PRESENTATION SLIDES IN A CLOUD COLLABORATION PLATFORM

CROSS-REFERENCE TO RELATED APPLICATIONS

This application claims the benefit of U.S. Provisional Patent Application 62/733,075, by Li, et al., "User Experience Improvements For The Development Of Presentation Slides In A Cloud Collaboration Platform," filed Sep. 18, 2018, U.S. Provisional Patent Application 62/735,746, by Chung, et al., "Reader Mode and Insights for Presentation Slides in a Cloud Collaboration Platform," filed Sep. 24, 2018, and U.S. Provisional Patent Application 62/735,731, by Chung, et al., "Slide Grid Snapping and Comment Anywhere For Presentation Slides In a Cloud Collaboration Platform," filed Sep. 24, 2018, which are hereby incorporated by reference in their entirety.

This application is related to U.S. patent application Ser. No. 16/263,851 titled "Reader Mode For Presentation Slides In A Cloud Collaboration Platform," filed herewith and U.S. patent application Ser. No. 16/263,860 titled "Insights Panel For Presentation Slides In A Cloud Collaboration Platform," filed herewith, both of which are herein incorporated by reference in their entireties.

BACKGROUND

A cloud collaboration platform may allow users to author various forms of content, for example, documents, text files, spreadsheets, presentation slides, and other files. The cloud collaboration platform may furnish a litany of word processing tools to these authors in order to facilitate document creation and editing. An author may also communicate with other users on the cloud collaboration platform, share documents, and receive comments, suggestions, edits, and other feedback. By integrating communication tools with word processor tools, a cloud collaboration platform may enhance workflows, save time, and promote teamwork.

BRIEF DESCRIPTION OF THE DRAWINGS

The accompanying drawings are incorporated herein and form a part of the specification.

DETAILED DESCRIPTION

Figure 1:
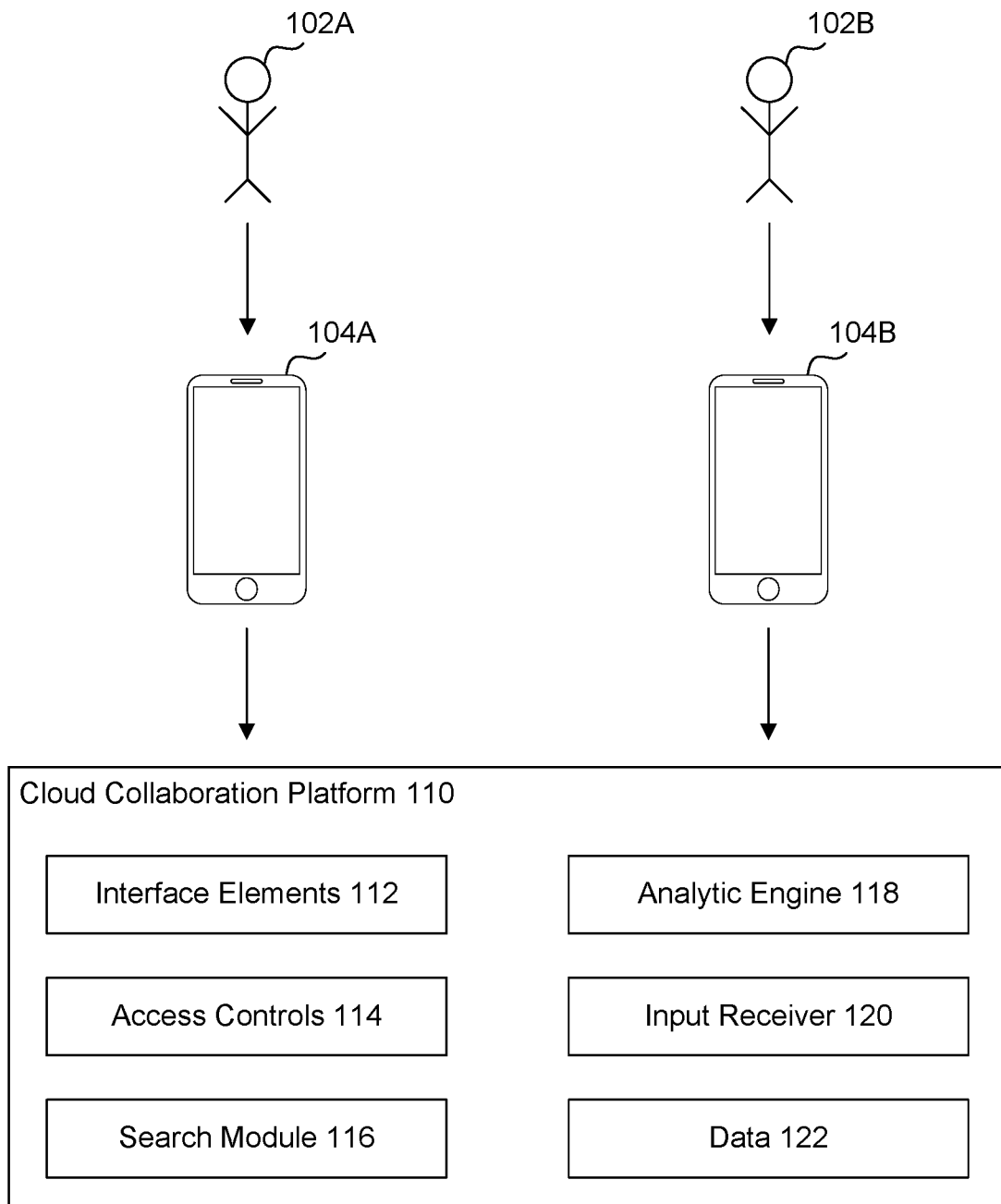
FIG. 1 is a schematic block diagram showing an example system including a cloud collaboration platform, according to some embodiments.

Provided herein are system, apparatus, device, method and/or computer program product embodiments, and/or combinations and sub-combinations thereof, for providing slide grid snapping when editing presentation slides within a cloud collaboration platform.

A cloud collaboration platform may allow multiple users to work together to design, write, implement, edit, and finalize various forms of content. Such content may be documents, text files, spreadsheets, presentation slides, videos, audio files, or any other suitable types of files. A cloud collaboration platform may include word processing and editing tools to create, compose, draft, and revise these files. A cloud collaboration platform may include a versioning system or methodology to dynamically track changes over time.

A cloud collaboration platform may incorporate various forms of permissions and access controls. For example, a cloud collaboration platform may allow users to set access permissions to stored files. In an embodiment, an author may control whether other users may edit a document or just view the document. An author may set access permissions on a per-user, i.e., grant access to only one user or a subset of users, and per-document basis, i.e., configure a different set of access permissions for each file in the cloud collaboration platform.

A cloud collaboration platform may encourage communication and collaboration among users by allowing users to send other users messages, post to a message board, include comments in document or file, and engage in other suitable communicative activities. Some comments in a cloud collaboration platform may be viewable by all users while other comments may be user-specific and only viewable by a subset of the users. Comments may tag, link, or reference other users or other documents. Comments may include feedback stickers, i.e., prompts via which users can receive information from other users (e.g., conduct polls, receive text answers to questions, etc.).

A cloud collaboration platform may include presentation slides among the documents that users may create, edit, and finalize. Users may collaborate to build presentation content.

By integrating a variety of word processing and communication tools into the slide design process, users may save time that would otherwise be lost in meetings or spent resorting to third-party communication or editing tools. For example, a user may add a new slide to a presentation and edit the slide directly in the cloud collaboration platform. Editing capabilities may include adding text, images, audio/video components, selecting colors, and many other suitable actions. A second user may make further edits, add comments to the slide presentation, raise questions, and provide additional feedback.

When editing presentation slides, a slide designer may face difficulties arranging and sizing the objects (text, images, etc.) in the slide. For example, the designer may arrange an object or objects in the desired fashion, but then add another object and have to resize and re-arrange the original objects based on the added object. The ease of design and the efficiency of the user experience may be improved by serializing and coordinating design actions using a visually evident, two-dimensional framework.

Accordingly, a need exists to provide slide grid snapping when editing presentation slides in a cloud collaboration platform.

FIG. 1 is a schematic block diagram showing an example system 100 including a cloud collaboration platform, according to some embodiments. System 100 may include users 102, such as user 102A and user 102B, devices 104, such as device 104A and 104B, and cloud collaboration platform 110. Cloud collaboration platform 110 may include interface elements 112, access controls 114, search module 116, analytics engine 118, input receiver 120, and data 122.

Users 102 may be individuals or entities using a cloud collaboration platform or other suitable software application. Users 102 may members of a business, organization, or other suitable group using the cloud collaboration platform to perform tasks related to that business or organization. Users 102 may be individuals using a cloud collaboration platform for personal pursuits. Users 102 may be human beings, but users 102 may also be artificial intelligence constructs. Users 102 may employ, i.e., connect to, a network or combination of networks including the Internet, a local area network (LAN), a wide area network (WAN), a wireless network, a cellular network, or various other types of networks as would be appreciated by a person of ordinary skill in the art.

Devices 104 may be personal digital assistants, desktop workstations, laptops or notebook computers, netbooks, tablets, smart phones, mobile phones, smart watches or other wearables, appliances, part of the Internet-of-Things, and/or embedded systems, to name a few non-limiting examples, or any combination thereof. Although devices 104 are illustrated in the example of FIG. 1 as a single computer, one skilled in the art(s) will understand that devices 104 may represent two or more computers in communication with one another. Therefore, it will also be appreciated that any two or more components of system 100 may similarly be executed using some or all of the two or more computers in communication with one another.

Cloud collaboration platform 110 may include interface elements 112, access controls 114, search module 116, analytics engine 118, input receiver 120, and data 122. Cloud collaboration platform 110 may combine word processing tools with communication tools in order to allow enhance teamwork and collaboration among multiple users in building, editing, and finalizing text files, documents, spreadsheets, presentation slides, and other files.

Interface elements 112 may provide components that allow cloud collaboration platform 110 to render a user interface for view by users 102 on devices 104. Interface elements 112 may include a JavaScript library or other user interface library to facilitate dynamic interactions between users 102 and cloud collaboration platform 110. Interface elements 112 may include a development toolkit facilitating the building and deployment of HTML5 applications or mobile applications. Interface elements 112 may include appropriate stylesheets and design formats to shape, for example, the display format of data retrieved by cloud collaboration platform 110.

Access controls 114 may control permissions and access to and/or within cloud collaboration platform 110. Access controls 114 may authorize connections using username/password combinations. In some embodiments, access controls 114 may employ an alternate authentication methodology, such as two-factor authentication, token authentication, biometric data, etc., to identify, authorize, encrypt, and account for user connections. The level of access granted to a user may vary depending on the user type; therefore, the functionality provided to users may differ depending on the individual user accessing the system. Access controls 114 may additionally track access to files among users 102. For example, access controls 114 may store information indicating that a particular user may access a particular document and an access level.

Search module 116 may allow users 102 to search for other users, documents, files, or data items within cloud collaboration platform 110. Search module 116 may employ a suitable search tool or indicator to receive an input from users 102. Search module 116 may use an appropriate cataloging methodology to store previous messages, comments, edits, etc. and retrieve appropriate information via full-text searches. Search module 116 may promote the use of "@" or "#" to retrieve appropriate documents or users that satisfy the searches from users 102.

Analytics engine 118 may perform advanced analysis of information contained in files and user comments to provide additional insights into the collaborative processes. For example, analytics engine 118 may review information stored in data 122 to determine a level of engagement among users 102 with a particular slide presentation or among several slide presentations. Such information analyzed may include the last time of activity for users, the amount of comments provided, the amount of presentation slides viewed, etc. Analytics engine 118 may provide derived analytical data to an insights tab or interface, as described below with reference to FIGS. 2 and 9. Analytics engine 118 may provide analytical data in the insights tab to users 102 using interface elements 112.

Input receiver 120 may receive and process inputs from users 102 within cloud collaboration platform 110. Input receiver 120 may receive inputs from any suitable mechanism including: a mouse, a keyboard, stylus, input gesture, or other suitable mechanism for expressing a user intentions. User inputs may include entering text, drawing checkmarks, circles, squares, lines, and other geographic symbols, swiping, clicking, tapping, dragging, and other gestures. Input receiver may use interface elements 112 to display appropriate navigational buttons, input forms, and other HTML fields to facilitate interaction with cloud collaboration platform 110.

Data 122 may be a variety of stored information relevant to the documents, messages, comments, and other information in cloud collaboration platform 110. Data 122 may be housed or stored in a relational database, a NoSQL database or other horizontally scaling database, a digital ledger technology or blockchain, or any other suitable storage mechanism. For instance, cloud collaboration platform 110 may harness any commercially available database management system to store and retrieve data 122. In an embodiment, data 122 may be stored in a centralized storage area network (SAN), network-attached storage (NAS), redundant array of independent disks, and/or any other configuration of storage devices to supply sufficient storage capacity to store database tables and supporting structures. Sufficient storage may alternatively exist in any other physically attached magnetic storage, cloud storage, or additional storage medium. In an embodiment, cloud collaboration platform 110 deploys a hard-disk interface, such as ATA, SATA, SCSI, SAS, and/or fibre for interfacing with storage mediums housing data 122.

Figure 2:
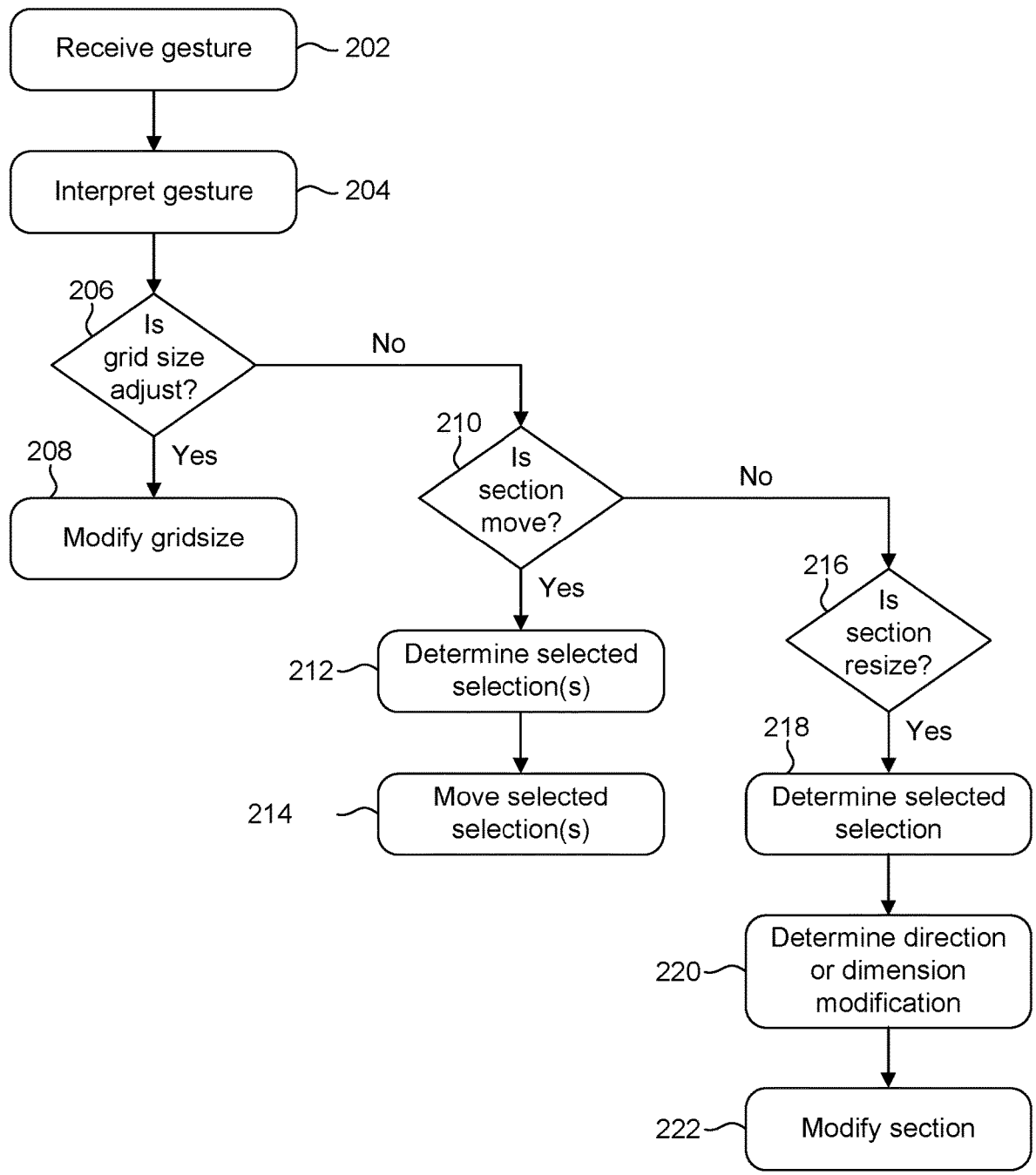
FIG. 2 is a flowchart illustrating a method of determining an intended action by gesture interpretation and resizing sections, moving sections, or modifying slide grid size, according to some embodiments.

FIG. 2 illustrates a method 200 of employing a gridding system in a cloud collaboration platform, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art(s).

In 202, cloud collaboration platform 110 may receive an input gesture via input receiver 120. The gesture may be received as an input or combination of inputs from any suitable mechanism including: a mouse, a keyboard, stylus, input gesture, or other suitable mechanism for expressing a user intentions. In one example, a gesture may be a selection by a user in users 102 of a particular element, section, layer, object or slide in a presentation in cloud collaboration platform 110. In another example, a gesture may be a grouping together of one or more elements, sections, layers, and/or objects in cloud collaboration platform 110. In a third example, a gesture may be a repositioning of a previously selected element, section, layer, object, slide, or grouping. In another example, a gesture may be a resizing of an object, such as object 304, a section, a layer, or an element. An object is an element in some embodiments. A layer is a plane within the slide that objects may, in some embodiments, appear in front of or behind.

In 204, cloud collaboration platform 110 interprets the meaning of the gesture by applying the context in which it is used in the slide. Cloud collaboration platform 110 may interpret the gesture in the context of a gridding system, where a grid of rows and columns is arranged visually by interface elements 112. In other words, cloud collaboration platform 110 may confine or limit the gesture to behaviors that match a gridding system. In this embodiment, a user that repositions a selected element may only be able to reposition the selected object according to parameters/limitations specified by the gridding system. For example, a user in users 102 may position an object with a boundary up against a line in the gridding system, but not in the spaces in between lines.

In 206, cloud collaboration platform 110 may determine if the gesture is an adjustment by the user to the grid size. If not, then method 200 may proceed to 210. If yes, then method 200 may proceed to 208.

In 208, cloud collaboration platform may resize the displayed grid. The slide grid spacing will be increased or decreased according to the instruction obtained from the user in 202, known as incrementing in some embodiments. In an embodiment, the zoom may be modified to accommodate the grid resizing, and the user may retain the same elements within view. In another embodiment, the view of users 102 may remain stationary. By resizing the grid, a user may better be able to manipulate objects, reposition objects, select groups, and perform other edits.

In 210, cloud collaboration platform 110 may determine if the gesture is movement of a section, layer, or object. If not, then method 200 may proceed to 216. If yes, then method 200 may proceed to 212.

In 212, cloud collaboration platform 110 may determine which sections, objects, and layers were selected or de-selected in 202. Interface elements 112 may employ input receiver 120 and interface elements 112 to determine a user intent that complies with the gridding system. For example, a user may add an object (e.g., text, image, etc.) to an existing group using an appropriate gesture. In another example, a user may remove an object from an existing group. An input, in some embodiments, may be a locational input, which identifies a specific row and a specific column within the grid system on a slide. Proximity may be calculated by finding the closest specific column and specific row within the grid system on a slide in some embodiments.

In 214, cloud collaboration platform 110 may remove an object from a section or add an object to a section in accordance with the determination made in 212. In an embodiment, users 102 may specify a location when gesturing and the selected section or sections will be moved to the location indicated by the gesture. Interface elements 112 may update the view in accordance with the determined change, e.g., by using shading or bolding to indicate the objects that are contained within the selection.

In 216, cloud collaboration platform 110 may determine if the gesture is a section resizing. If not, then method 200 may end and wait for a further gesture to be received from users 102. If yes, then method 200 may proceed to 218.

In 218, cloud collaboration platform 110 may determine which sections, objects, and layers are currently selected. In one example, a section may coincide with a particular object, i.e., only one object may be determined to be currently selected.

In 220, cloud collaboration platform 110 may determine the direction and/or dimension of the modification. In one embodiment, input receiver 120 may receive a positional change in association with the resizing, for example, a mouse movement or a swipe to indicate both the direction to resize and the dimension or extent of the resizing.

In 222, cloud collaboration platform 110 may modify the section in accordance with the determined selection in 218 and the determined direction and/or dimension in 220. Cloud collaboration platform 110 may employ interface elements 112 to dynamically resize the section will be modified accordingly. In an embodiment, the resizing may apply to a section and each object within the selection may be resized in a similar fashion. In an embodiment, the resizing may be limited to the grid spaces. In other words, users 102 may only be able to resize in discrete, modular steps such that selected sections or objects remain affixed to the rows and columns of the grid.

Figure 3A:
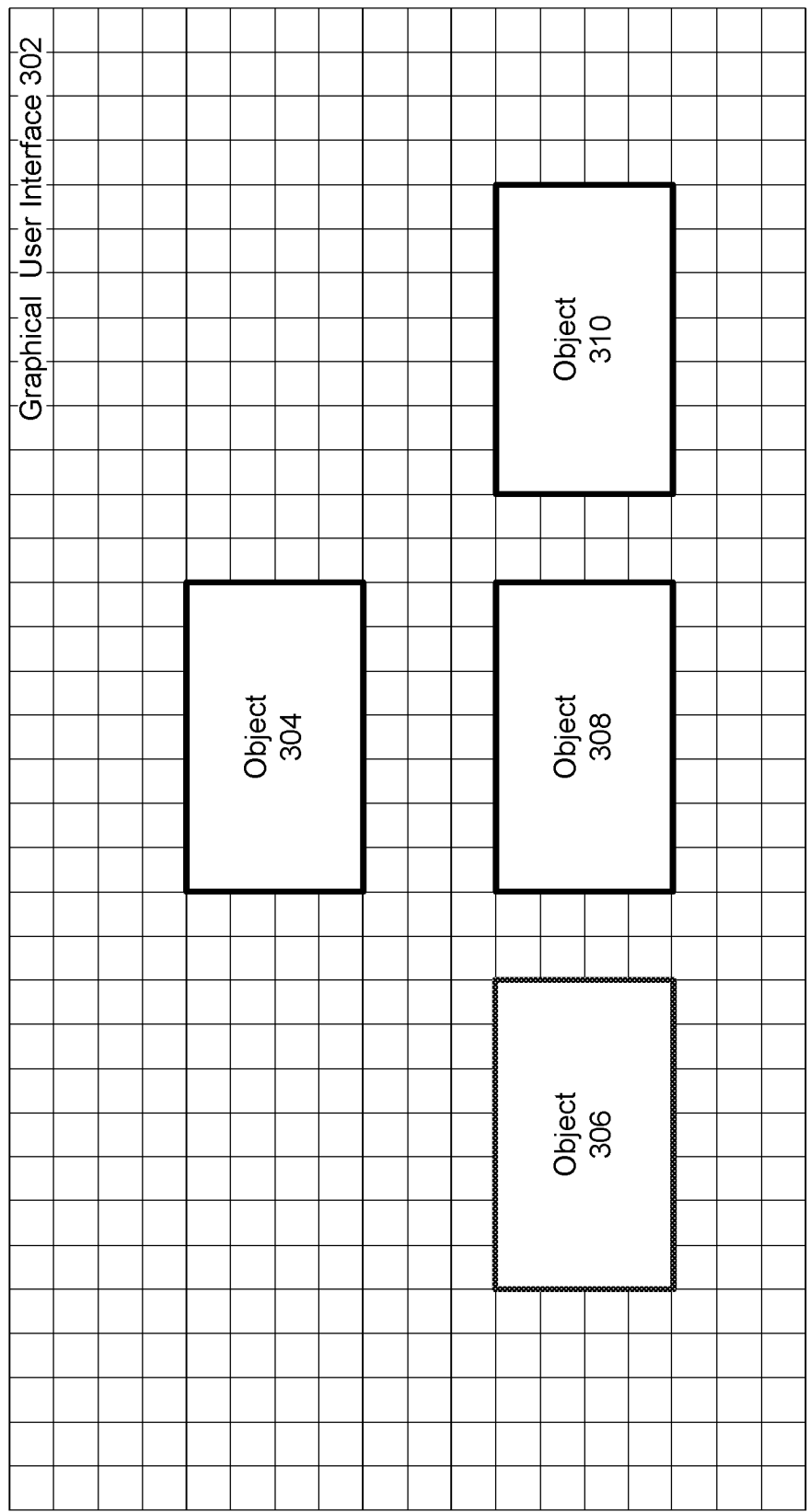
FIG. 3A is a block diagram of a graphical user interface including a slide grid snapping system, according to some embodiments.

FIG. 3A is an example of graphical user interface 302 platform including a slide grid snapping system, according to some embodiments. Graphical user interface 302 may include object 304, object 306, object 308, and object 310. In this example, an account has begun to create a slide using the cloud collaborative environment. As part of that process, the account has placed four objects on the slide: object 304, object 306, object 308, and object 310.

Object 304, object 306, object 308, and object 310 may be elements in a slide in a slide presentation, for example, text, images, embedded video, etc. When moving the objects on the slide, the objects will align, both in size and position, with the gridlines, in some embodiments. So, in order to have better resolution over the size and position, an account may desire to increase the resolution of the grid by decreasing the number of pixels between gridlines or to decrease the resolution of the grid by increasing the number of pixels between gridlines. In turn, the account may vary the grid spacing in some embodiments.

Figure 3B:
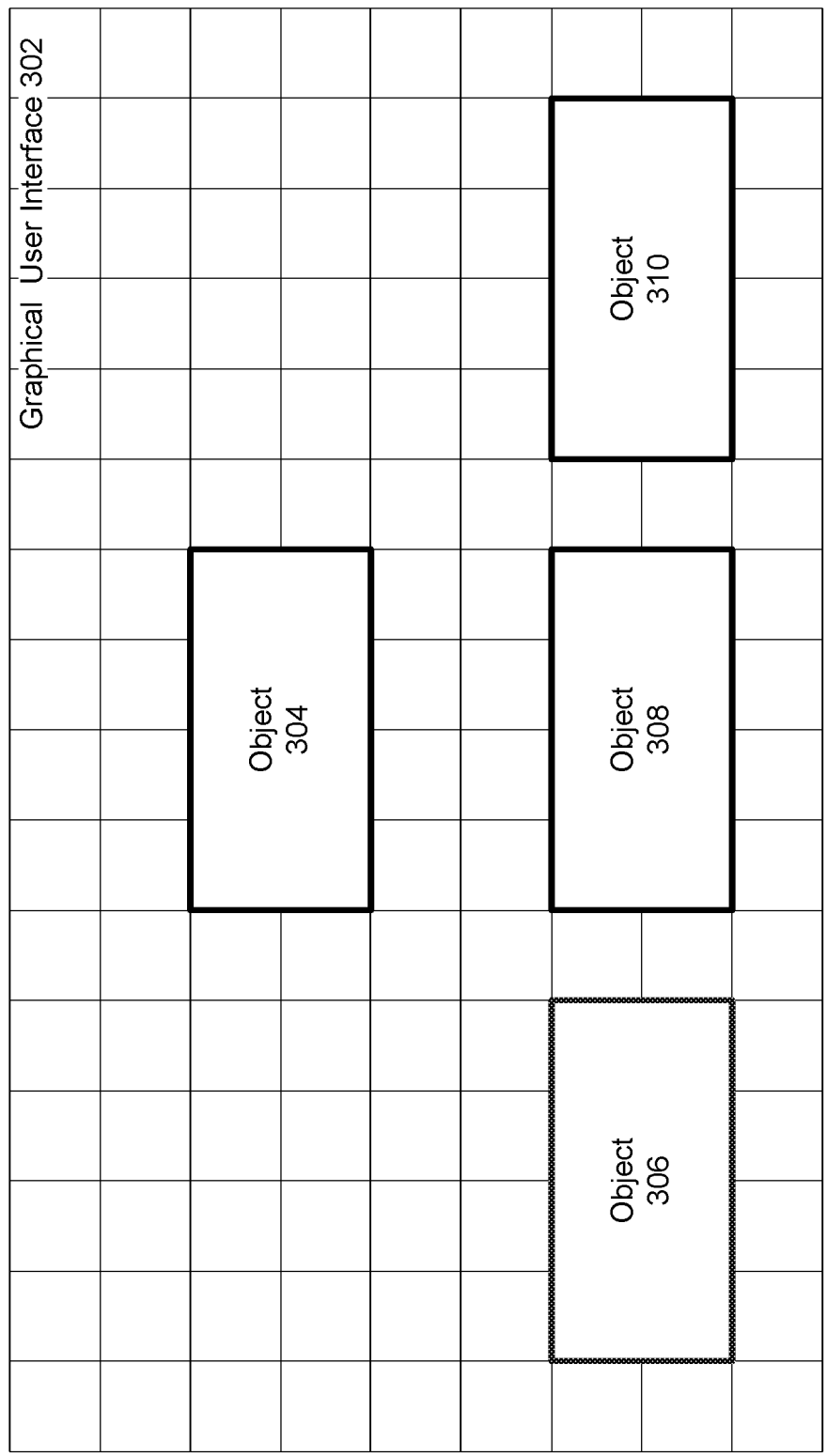
FIG. 3B is a block diagram of a graphical user interface including a slide grid snapping system with a modified grid size, according to some embodiments.

FIG. 3B is an example of graphical user interface 302 in a cloud collaboration platform including a slide grid snapping system after a grid size change has been implemented, according to some embodiments. In this example, the grid spacing has been increased by the account. In some embodiments, the result will be an automatic repositioning of objects and resizing of objects so they are still aligned with the gridlines. In some embodiments, the objects may be detached from the gridlines and remain where they were prior to the grid spacing dimensional change and in the same size.

Figure 3C:
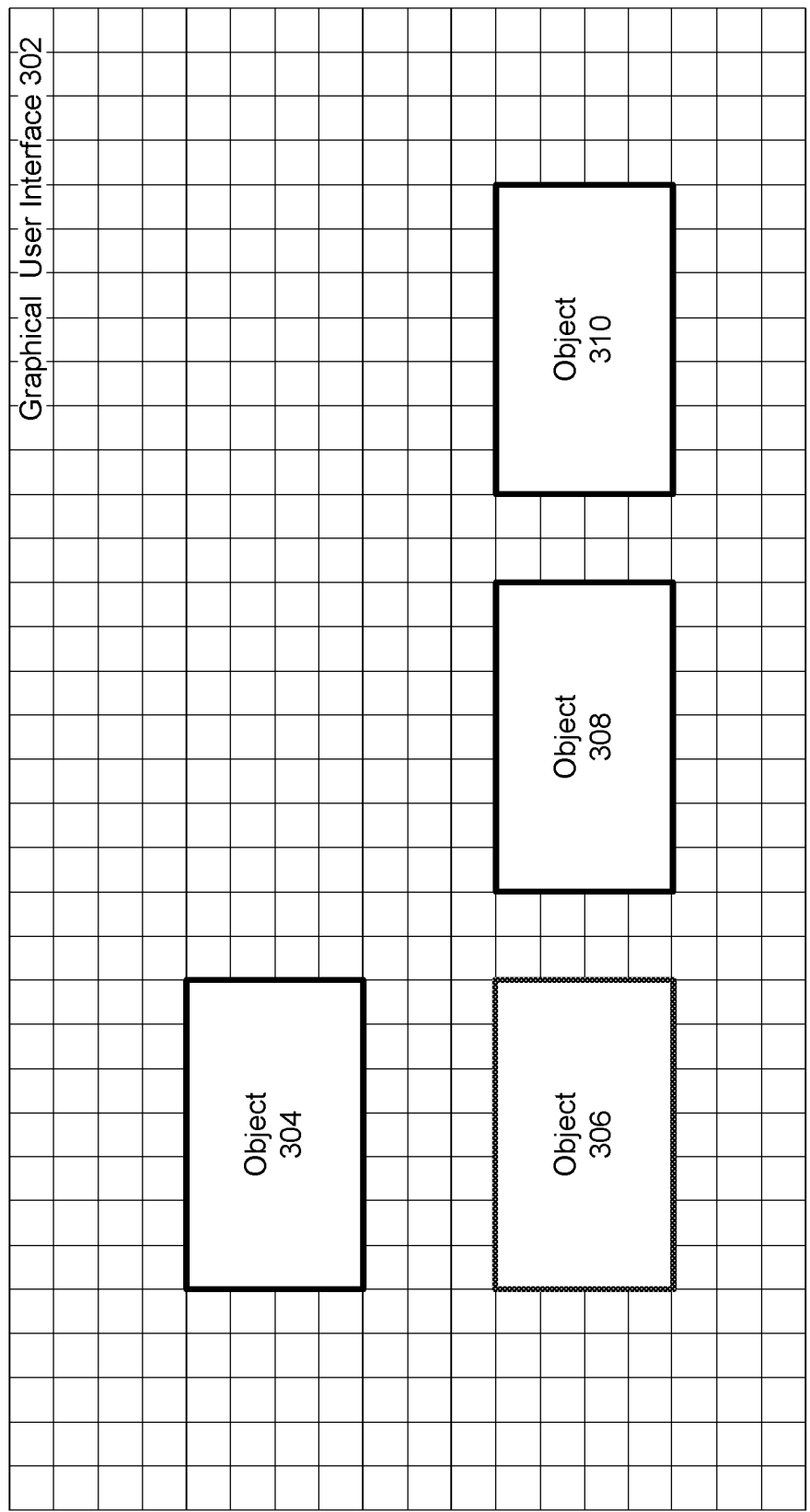
FIG. 3C is a block diagram of a graphical user interface including a slide grid snapping system with a moved section, according to some embodiments.

FIG. 3C is an example of graphical user interface 302 in a cloud collaboration platform including a slide grid snapping system after object 304 has been moved, according to some embodiments. In the example, object 304 has been repositioned. In the act of repositioning, in some embodiments, the object being repositioned will default to aligning with another object in similar position. In the example, object 304, when being moved to the left with a gesture by the account, will pause when its center aligns with the center of object 306. This pause gives time for the account to see the alignment and stop moving the object, which in turn allows the user to more quickly create a slide with visual appeal derived from well aligned objects in an orderly manner, in some embodiments.

Figure 3D:
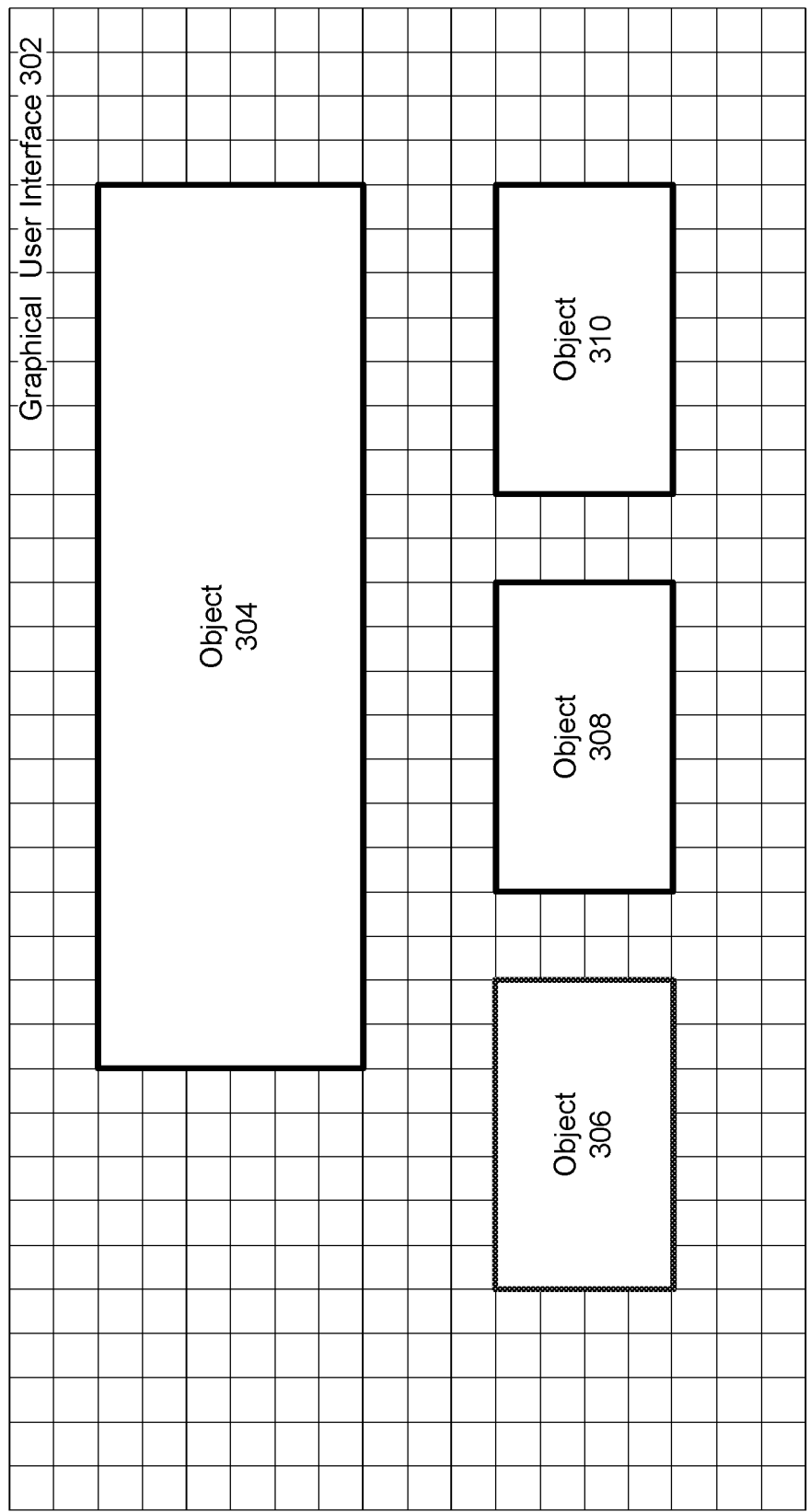
FIG. 3D is an example block diagram of a graphical user interface including a slide grid snapping system with a section after its dimensions were modified, according to some embodiments.

FIG. 3D is an example of graphical user interface 302 in a cloud collaboration platform including a slide grid snapping system after object 304 has been resized, according to some embodiments. In the example, the account desires to resize object 304 making it larger. After the appropriate input gesture, the cloud collaboration platform recognizes the desire by the account to enlarge object 304 and, based on the direction and intensity of gesture, in some embodiments, the cloud collaboration platform will adjust the size of object 304 and render the image on the slide. In some embodiments, if slide grid snapping is activated, the cloud collaboration platform will align the edges of object 304 after resizing to coincide with the grid lines. In some embodiments, the cloud collaboration platform will pause during the resizing operation to an anticipated size of the object for the ease of the account. This, as an example, may coincide with the outer edges of object 306 and 310 or with the center of object 306 and the center of 310 in some embodiments.

Viewers of the slides may share feedback in the form of comments and messages with other users in the cloud computing platform. One method of sharing feedback among the various parties is to insert comments into slide. When a user chooses to insert a comment into the slide, a comment can be associated with the entire slide or with a particular section.

Figure 4:
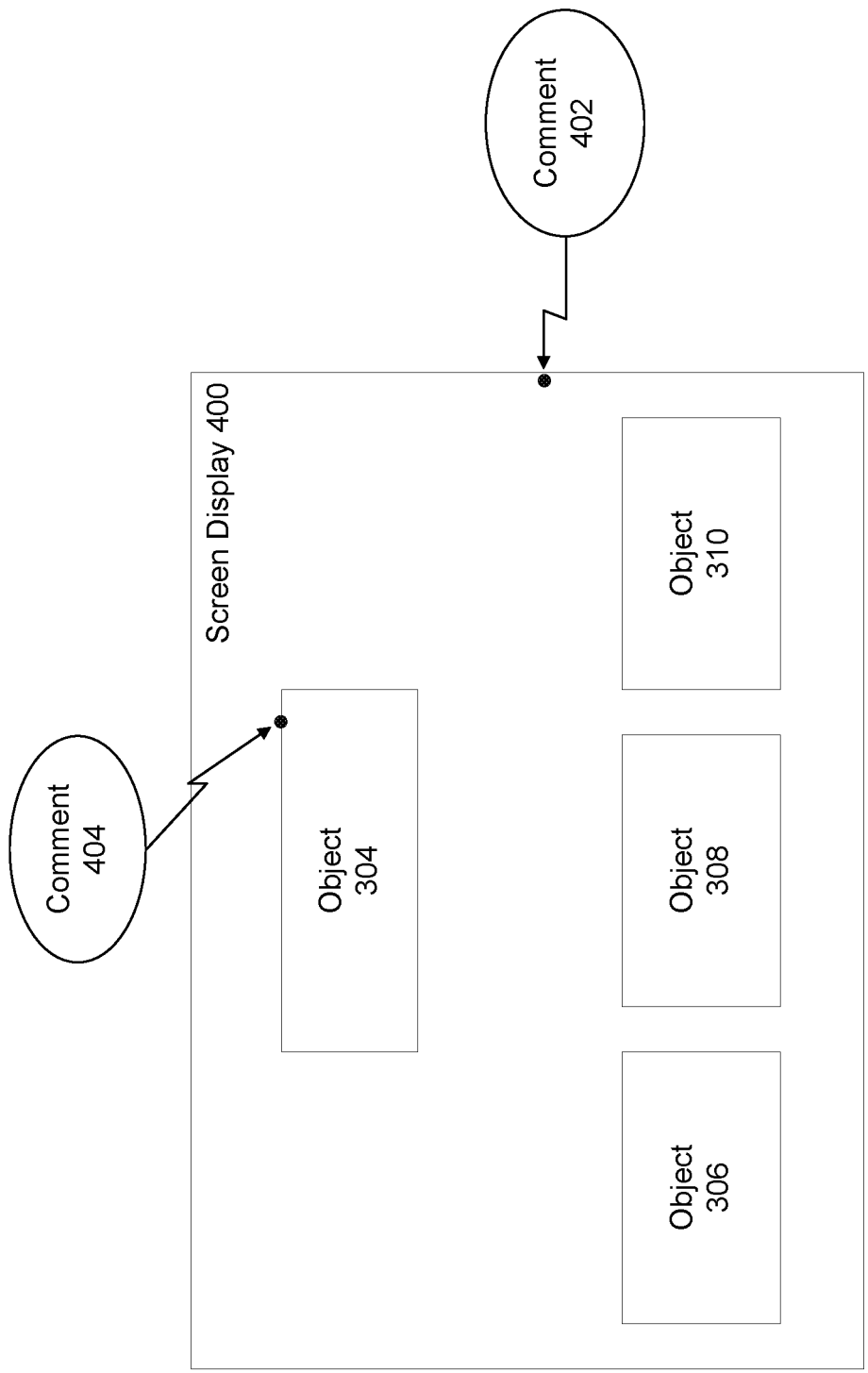
FIG. 4 is an example block diagram of a screen display including added comments, according to some embodiments.

FIG. 4 is an block diagram of screen display 400 in a cloud collaboration platform including a presentation slide with comments, according to some embodiments. Screen display 400 may include objects and comment 402 and comment 404.

Comment 402 and comment 404 may be comments entered by users 102. In an embodiment, comment 402 may be associated with the slide, i.e. the slide in the presentation currently being viewed in screen display 400. Comment 404 may be associated with a particular object, section, or layer within the cloud collaboration platform. In some embodiments, a colored dot will appear where the comment is placed to indicate association with the slide as a whole or with an individual object within the slide. When a user makes a gesture indicating desire to read the comment, the cloud collaboration system will display the comment in some embodiments. If a comment is associated with an object, and the object is moved, the comment dot will move with it. Additionally, if the object is deleted from the slide, the comment will be deleted as well, in some embodiments. If a comment is associated with the entire slide, then it may be repositioned anywhere on the slide by the account, in some embodiments.

Figure 5A:
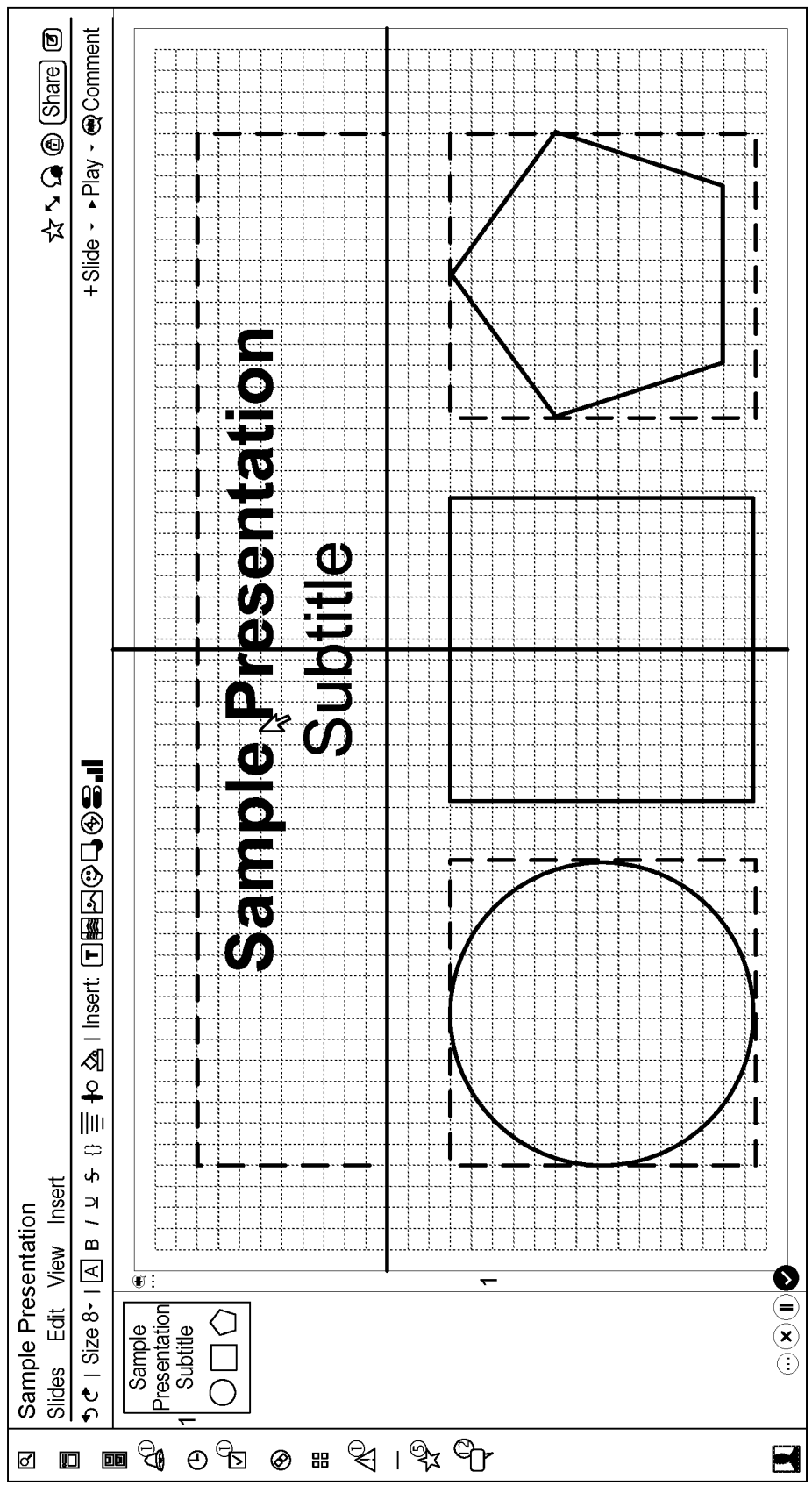
FIG. 5A is an example screen display of a cloud collaboration platform including sections with a section selected, according to some embodiments.

FIG. 5A is an example of graphical user interface 302 platform including a slide grid snapping system, according to some embodiments. In the example provided below in FIG. 5A object 304 is represented by the rectangle enclosing "Sample Presentation" text, object 306 is represented by a circle, object 308 is represented by a square, and object 310 is represented by a pentagon.

Figure 5B:
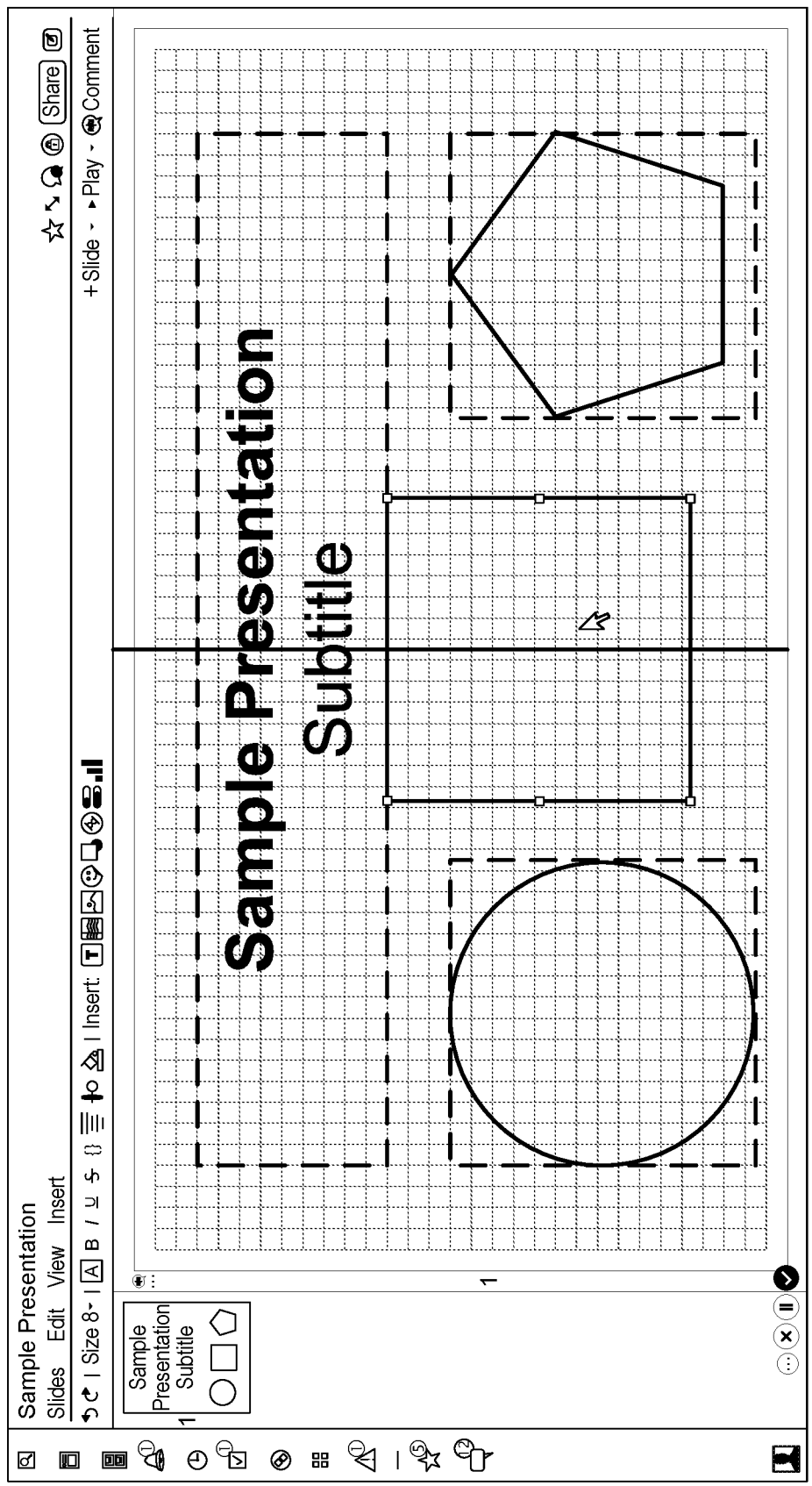
FIG. 5B is an example screen display of a cloud collaboration platform including sections with a section moved, according to some embodiments.

FIG. 5B is an example of graphical user interface 302 in a cloud collaboration platform including a slide grid snapping system after object 304 has been moved, according to some embodiments. In the example provided below in FIG. 5B, graphical user interface 302 is illustrated with object 308 moved three grid points to up after a user moved a selected section. In this example, the cloud collaboration platform has encouraged the appropriate alignment with the title block, object 304, by hesitating the movement gesture once the edges of object 304 and object 308 were aligned. This allowed the account to quickly reposition object 308 without overlapping the objects.

Figure 6A:
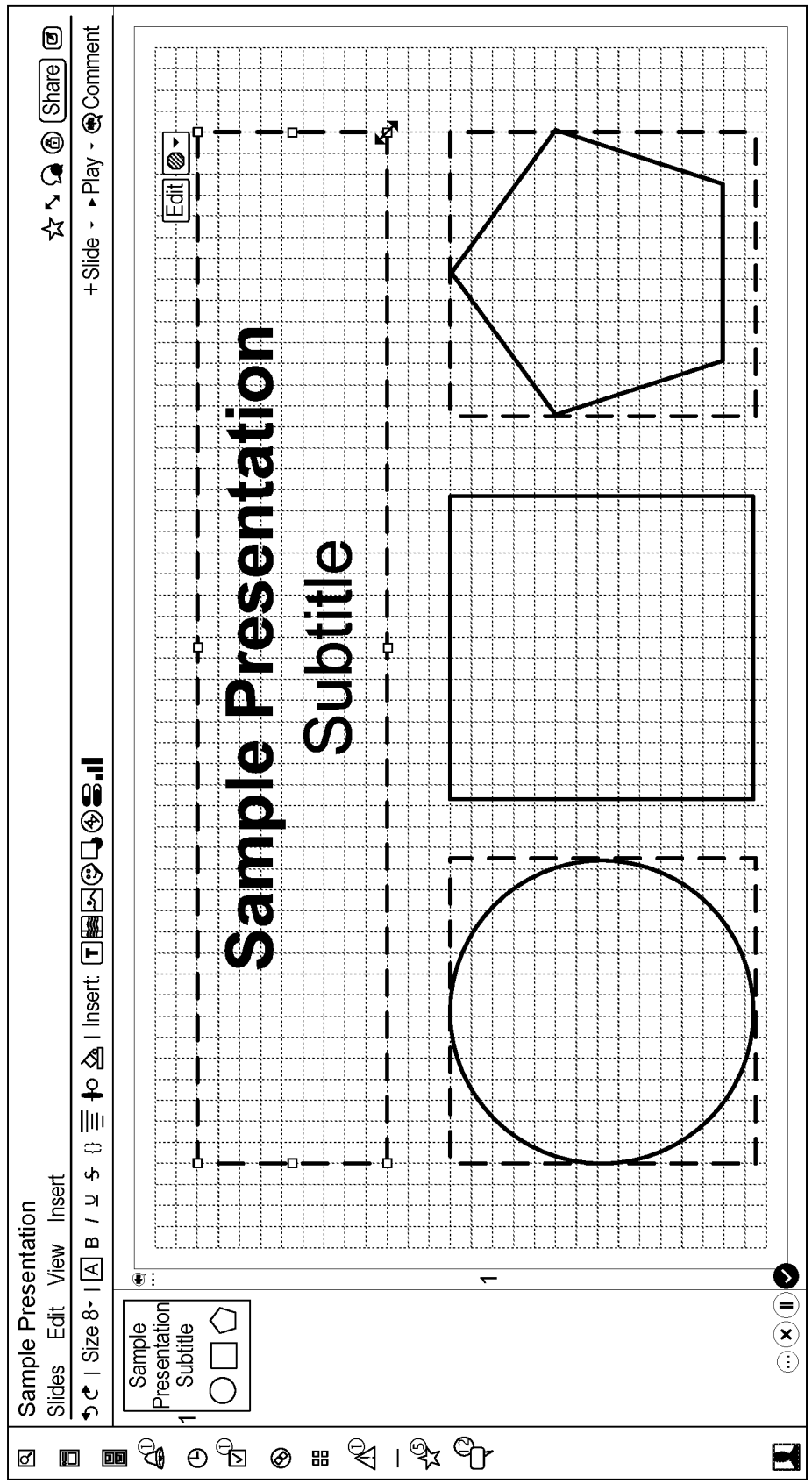
FIG. 6A is an example screen display of a cloud collaboration platform with resize gesture indicated, according to some embodiments.

FIG. 6A is an example of graphical user interface 302 in a cloud collaboration platform including a slide grid snapping system after a resize gesture has been received for object 304, according to some embodiments.

Figure 6B:
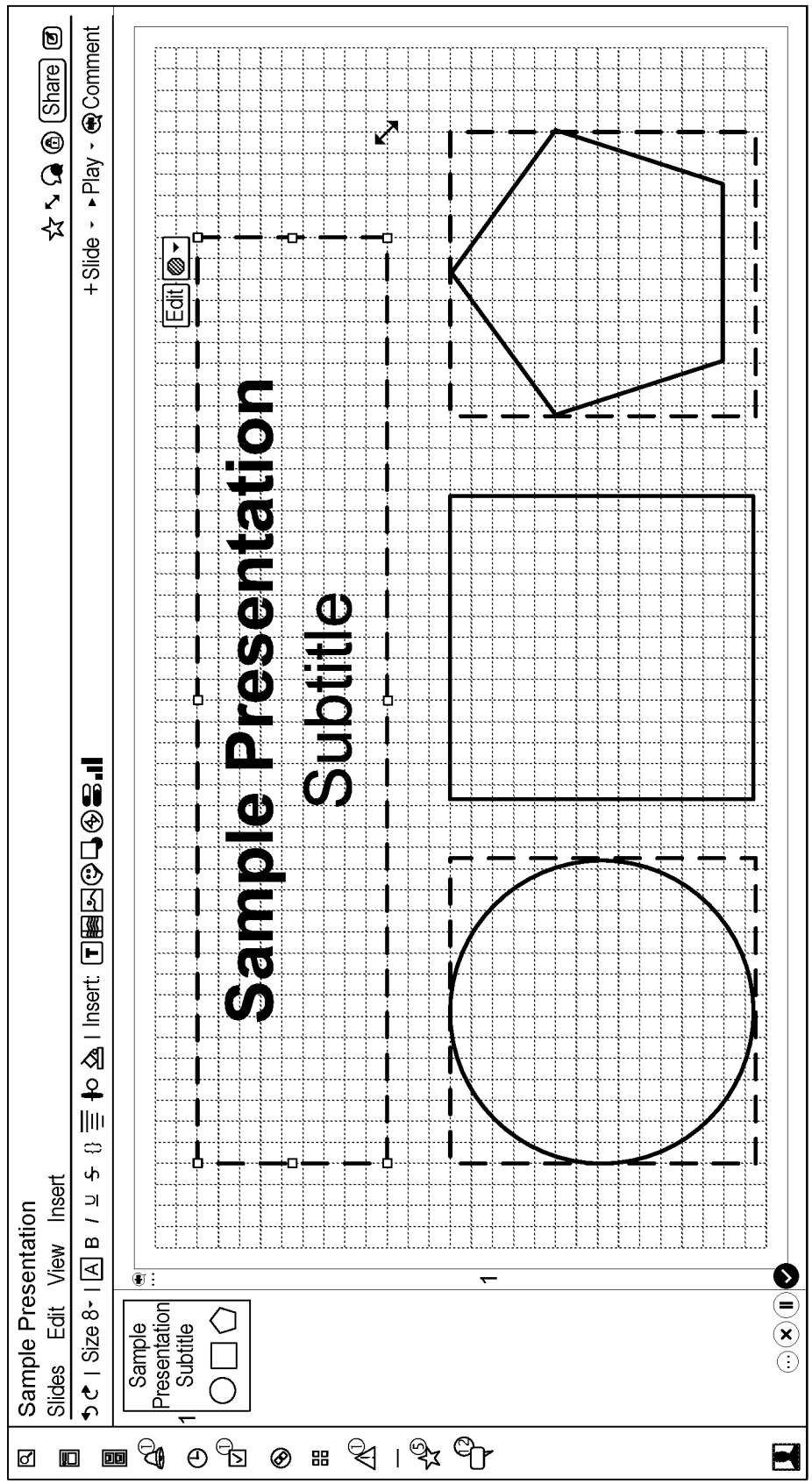
FIG. 6B is an example screen display of a cloud collaboration platform after resize gesture is implemented on section, according to some embodiments.

FIG. 6B is an example of graphical user interface 302 in a cloud collaboration platform including a slide grid snapping system after object 304 has been resized, according to some embodiments. In the example, object 304 title block is being resized. In some embodiments, the font size of text used in object 304 will automatically resize and reposition based on the adjusted size of object 304 to maintain visual appeal.

Figure 7:
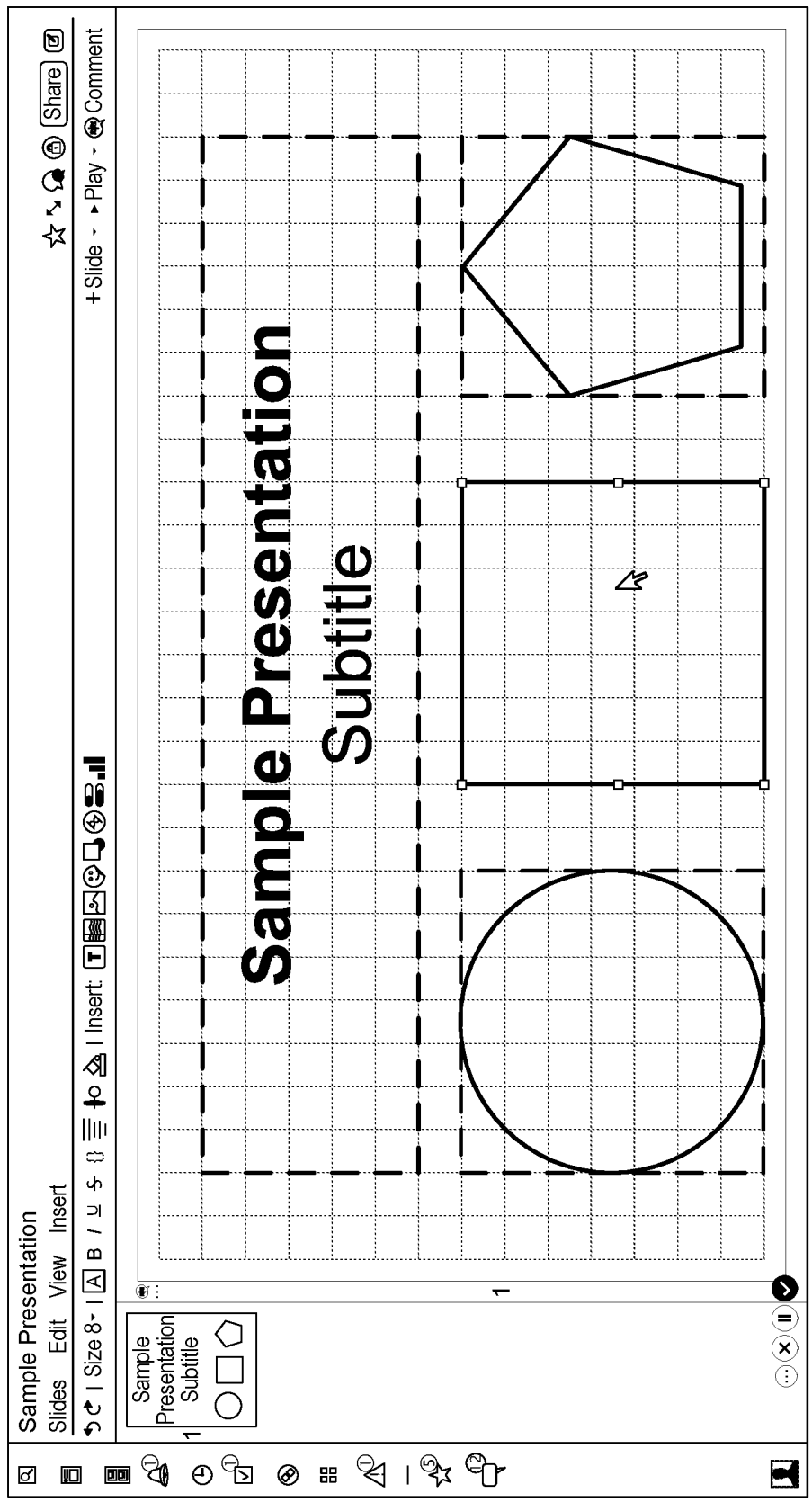
FIG. 7 is an example screen display of a cloud collaboration platform including an increased grid size, according to some embodiments.

FIG. 7 is an example of graphical user interface 302 in a cloud collaboration platform including a slide grid snapping system after a grid size change has been implemented, according to some embodiments. In the example provided in FIG. 7, graphical user interface 302 is illustrated with the resulting slide after the grid was resized by a user. In this example, with a larger grid size, if slide grid snapping is enabled, the movement of objects will be easier to align, particularly depending on the type of display being used by the cloud collaboration platform. This will assist the account in developing a slide rapidly while maintaining good alignment for visual appeal when displayed on another device using the cloud collaboration platform.

Figure 8:
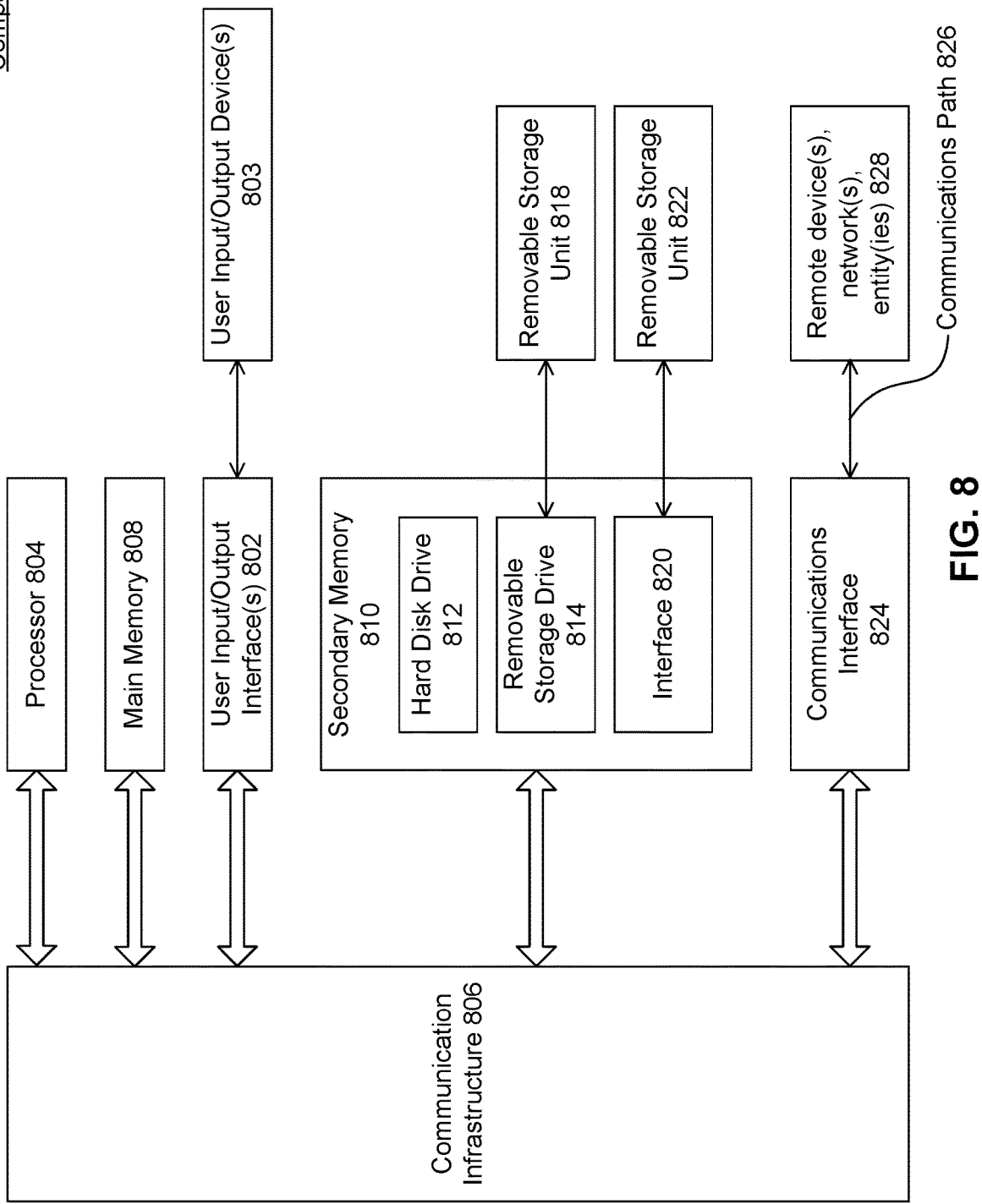
FIG. 8 is an example computer system useful for implementing various embodiments. In the drawings, like reference numbers generally indicate identical or similar elements. Additionally, generally, the left-most digit(s) of a reference number identifies the drawing in which the reference number first appears.

FIG. 8 is an example computer system useful for implementing various embodiments. Various embodiments may be implemented, for example, using one or more well-known computer systems, such as computer system 800 shown in FIG. 8. One or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 802, such as monitors, keyboards, pointing devices, etc., which may communicate with communication infrastructure or bus 806 through user input/output device(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
   displaying, by one or more processors, a slide in a presentation in a cloud collaboration platform that allows a first user and a second user to concurrently edit the slide, wherein the slide comprises a first displayed object, a second displayed object, a third displayed object, and a displayed grid comprising rows, columns, and a grid spacing, wherein the grid spacing comprises a number of pixels between each row in the rows and each column in the columns;
   adjusting, by the one or more processors, the number of pixels based on a grid size change input from the first user and concurrently modifying a zoom level to accommodate the adjusting for both the first user and the second user viewing the slide;
   realigning, by the one or more processors, the first displayed object, the second displayed object, and the third displayed object with the displayed grid in response to the grid size change input;
   receiving, by the one or more processors, from the first user, a first input indicating a selection of the first displayed object and a second input indicating a movement of the first displayed object;
   interpreting, by the one or more processors, the movement of the first displayed object based on the rows and the columns in the displayed grid and rendering the slide in the presentation for the first user and the second user based on the interpreted movement of the first displayed object, wherein the first displayed object attaches to a particular row in the rows and a particular column in the columns, wherein the particular row and the particular column are determined based on a proximity between the first displayed object and the particular row and the particular column;
   receiving, by the one or more processors, from the first user, a third input indicating a selection of both the first displayed object and the second displayed object, a fourth input indicating a resizing operation of the selection, and a fifth input comprising a comment;

in response to the resizing operation, resizing, by the one or more processors, the first displayed object and the second displayed object concurrently based on the rows and the columns in the displayed grid such that the first displayed object and the second displayed object resize in a modular step such that the first displayed object and the second displayed object remain affixed to the rows and the columns of the displayed grid while leaving the third displayed object unchanged;

in response to the fifth input, associating, by the one or more processors, the comment with the first displayed object and the second displayed object; and rendering, by the one or more processors, the slide in the presentation for the first user and the second user based on the resizing operation, wherein the slide displays the comment in association with the first displayed object and the second displayed object.

2. The method of claim 1, further comprising:

displaying, by the one or more processors, a layer in the slide;

receiving, by the one or more processors, a second comment from the first user and a locational input that specifies the layer;

associating, by the one or more processors, the second comment with the layer based on the locational input; and rendering, by the one or more processors, the second comment in association with the layer for the first user and the second user.

3. The method of claim 1, further comprising:

receiving, by the one or more processors, a second comment from the first user and a sixth input that specifies the second comment is associated with the slide;

associating, by the one or more processors, the second comment with the slide; and rendering, by the one or more processors, the second comment in association with the slide for the first user and the second user.

4. The method of claim 1, further comprising:

receiving, by the one or more processors, a second comment from the first user and a locational input, wherein the locational input specifies a specific row and a specific column on the slide;

associating, by the one or more processors, the second comment with the specific row and the specific column based on the locational input; and rendering, by the one or more processors, the second comment in association with the specific row and the specific column for the first user and the second user.

5. The method of claim 1, the resizing further comprising:

interpreting, by the one or more processors, the resizing operation to attach the first displayed object to the particular row in the rows in the displayed grid and the particular column in the columns in the displayed grid.

6. The method of claim 1, further comprising:

determining, by the one or more processors, a user type of a third user;

determining, by the one or more processors, an access setting of the comment; and rendering, by the one or more processors, the comment for the third user if the user type is sufficient to view the comment.

7. The method of claim 1, further comprising:

determining, by the one or more processors, a sixth input indicating an addition of the third displayed object to the selection.

8. A system, comprising:

a memory; and at least one processor coupled to the memory and configured to:

display a slide in a presentation in a cloud collaboration platform that allows a first user and a second user to concurrently edit the slide, wherein the slide comprises a first displayed object, a second displayed object, a third displayed object, and a displayed grid comprising rows, columns, and a grid spacing, wherein the grid spacing comprises a number of pixels between each row in the rows and each column in the columns;

adjust the number of pixels based on a grid size change input from the first user and concurrently modifying a zoom level to accommodate the adjusting for both the first user and the second user viewing the slide;

realign the first displayed object, the second displayed object, and the third displayed object with the displayed grid in response to the grid size change input;

receive, from the first user, a first input indicating a selection of the first displayed object and a second input indicating a movement of the first displayed object;

interpret the movement of the first displayed object based on the rows and the columns in the displayed grid and render the slide in the presentation for the first user and the second user based on the interpreted movement of the first displayed object, wherein the first displayed object attaches to a particular row in the rows and a particular column in the columns, wherein the particular row and the particular column are determined based on a proximity between the first displayed object and the particular row and the particular column;

receive, from the first user, a third input indicating a selection of both the first displayed object and the second displayed object, a fourth input indicating a resizing operation of the selection, and a fifth input comprising a comment;

in response to the resizing operation, resize the first displayed object and the second displayed object concurrently based on the rows and the columns in the displayed grid such that the first displayed object and the second displayed object resize in a modular step such that the first displayed object and the second displayed object remain affixed to the rows and the columns of the displayed grid while leaving the third displayed object unchanged;

in response to the fifth input, associate the comment with the first displayed object and the second displayed object; and render the slide in the presentation for the first user and the second user based on the resizing operation, wherein the slide displays the comment in association with the first displayed object and the second displayed object.

9. The system of claim 8, the at least one processor further configured to:

display a layer in the slide;

receive a second comment from the first user and a locational input that specifies the layer;

associate the second comment with the layer based on the locational input; and render the second comment in association with the layer for the first user and the second user.

10. The system of claim 8, the at least one processor further configured to:
receive a second comment from the first user and a sixth input that specifies that the second comment is associated with the slide;
associate the second comment with the slide; and
render the second comment in association with the slide for the first user and the second user.

11. The system of claim 8, the at least one processor further configured to:
receive a second comment from the first user and a locational input, wherein the locational input specifies a specific row and a specific column on the slide;
associate the second comment with the specific row and the specific column based on the locational input; and
render the second comment in association with the specific row and the specific column for the first user and the second user.

12. The system of claim 8, wherein to resize, the at least one processor is further configured to:
interpret the resizing operation to attach the first displayed object to the particular row in the rows in the displayed grid and the particular column in the columns in the displayed grid.

13. The system of claim 8, the at least one processor further configured to:
determine a user type of a third user;
determine an access setting of the comment; and
render the comment for the third user if the user type is sufficient to view the comment.

14. The system of claim 8, the at least one processor further configured to:
determine a sixth input indicating an addition of the third displayed object to the selection.

15. A non-transitory computer-readable device having instructions stored thereon that, when executed by at least one computing device, cause the at least one computing device to perform operations comprising:
displaying a slide in a presentation in a cloud collaboration platform that allows a first user and a second user to concurrently edit the slide, wherein the slide comprises a first displayed object, a second displayed object, a third displayed object, and a displayed grid comprising rows, columns, and a grid spacing, wherein the grid spacing comprises a number of pixels between each row in the rows and each column in the columns;
adjusting the number of pixels based on a grid size change input from the first user and concurrently modifying a zoom level to accommodate the adjusting for both the first user and the second user viewing the slide;
realigning the first displayed object, the second displayed object, and the third displayed object with the displayed grid in response to the grid size change input;
receiving, from the first user, a first input indicating a selection of the first displayed object and a second input indicating a movement of the first displayed object;
interpreting the movement of the first displayed object based on the rows and the columns in the displayed grid and rendering the slide in the presentation for the first user and the second user based on the interpreted movement of the first displayed object, wherein the first displayed object attaches to a particular row in the rows and a particular column in the columns, wherein the particular row and the particular column are determined based on a proximity between the first displayed object and the particular row and the particular column;
receiving, from the first user, a third input indicating a selection of both the first displayed object and the second displayed object, a fourth input indicating a resizing operation of the selection, and a fifth input comprising a comment;
in response to the resizing operation, resizing the first displayed object and the second displayed object concurrently based on the rows and the columns in the displayed grid such that the first displayed object and the second displayed object resize in a modular step such that the first displayed object and the second displayed object remain affixed to the rows and the columns of the displayed grid while leaving the third displayed object unchanged;
in response to the fifth input, associating the comment with the first displayed object and the second displayed object; and
rendering the slide in the presentation for the first user and the second user based on the resizing operation, wherein the slide displays the comment in association with the first displayed object and the second displayed object.

16. The non-transitory computer-readable device of claim 15, the operations further comprising:
displaying a layer in the slide;
receiving a second comment from the first user and a locational input that specifies the layer;
associating the second comment with the layer based on the locational input; and
rendering the second comment in association with the layer for the first user and the second user.

17. The non-transitory computer-readable device of claim 15, the operations further comprising:
receiving a second comment from the first user and a sixth input that specifies that the second comment is associated with the slide;
associating the second comment with the slide; and
rendering the second comment in association with the slide for the first user and the second user.

18. The non-transitory computer-readable device of claim 15, the operations further comprising:
receiving a second comment from the first user and a locational input, wherein the locational input specifies the specific row and the specific column on the slide;
associating the second comment with the specific row and the specific column based on the locational input; and
rendering the second comment in association with the specific row and the specific column for the first user and the second user.

19. The non-transitory computer-readable device of claim 15, the resizing further comprising:
interpreting the resizing operation to attach the first displayed object to the particular row in the rows in the displayed grid and the particular column in the columns in the displayed grid.

20. The non-transitory computer-readable device of claim 15, the operations further comprising:
determining a sixth input indicating an addition of the third displayed object to the selection.

* * * * *